United States Patent [19]
Lee et al.

[11] 3,947,812
[45] Mar. 30, 1976

[54] IGNITION SWITCH-ACTIVATED MESSAGE SYSTEM

[76] Inventors: Joseph K Lee, 10616 Bramblebush Ave., Whittier, Calif. 90604; Richard J. Lee, 1432 Countrywood Road, Hacienda Heights, Calif. 91745

[22] Filed: Nov. 20, 1974

[21] Appl. No.: 525,382

[52] U.S. Cl. .............. 340/52 D; 340/52 F; 340/53
[51] Int. Cl.² ..................................... G08B 19/00
[58] Field of Search ........ 340/52 R, 52 D, 52 F, 53; 307/10 R

[56] References Cited
UNITED STATES PATENTS

| | | | |
|---|---|---|---|
| 2,288,683 | 7/1942 | Clancy | 340/52 F |
| 2,706,806 | 4/1955 | Johnson | 340/52 D |
| 3,074,065 | 1/1963 | Orgill | 340/52 F |

*Primary Examiner*—Alvin H. Waring
*Attorney, Agent, or Firm*—Christie, Parker & Hale

[57] ABSTRACT

A message actuating system for automobiles includes a key operated ignition switch which is movable between a first position and a second position, the automobile ignition system being operative when the ignition switch is in either the first or second position. A message device, such as a tape player with a prerecorded message, is activated when the switch is in the first position. The message device is selectively deactivated, and the tape rewound, when the switch is turned to the second position.

12 Claims, 1 Drawing Figure

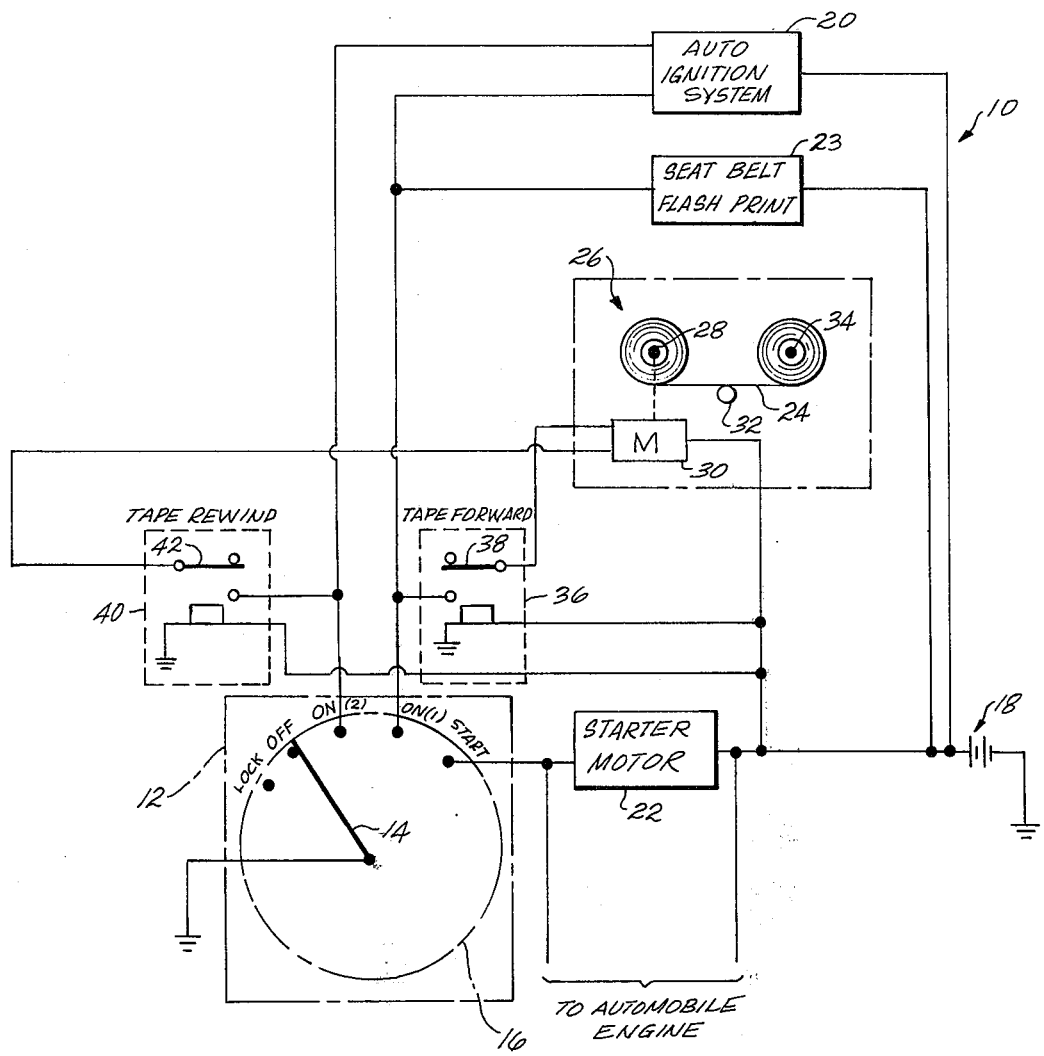

IGNITION SWITCH-ACTIVATED MESSAGE SYSTEM

BACKGROUND

This invention relates to a message actuating system for automobiles, and more particularly, to a message device which is automatically activated by the ignition switch of the automobile.

In recent years automobiles have been equipped with mandatory warning devices which are activated when the ignition key is turned on to remind the driver to fasten his seat belts. Such systems have included the mandatory ignition switch interlock which prevents the ignition system from starting the automobile until the seat belts are fastened.

It has recently been proposed to rescind Federal legislation requiring such devices because of general public dissatisfaction with them and the ability of drivers to circumvent them if they so desire. However, safety officials have objected to eliminating mandatory warning devices because of figures showing large reductions in automobile fatalities resulting from the use of seat belts.

SUMMARY

One embodiment of this invention provides a message actuating system for automobiles which can provide a reminder to fasten the seat belts, but in which the reminder can be selectively deactivated by the driver of the automobile after he has received the reminder.

Briefly, the message actuating system includes a key-operated ignition switch connected to the automobile ignition system and movable between a first position and a second position. The automobile ignition system is operative when the ignition switch is in either the first or second position. A message device in the interior of the automobile is activated when the ignition switch is in the first position. The ignition switch can be moved to the second position in which the automobile engine will still be operative, but in this position the message device will be deactivated.

The message device can be a flashing light on the dashboard of the automobile, such as a flashprint message warning the driver to fasten his seat belts. It can also be a buzzer for providing an audible reminder to fasten the seat belts.

In the preferred form of the invention, the message device comprises a tape player which can be used separately or in combination with the flashprint message device. The tape player includes foward tape drive means activated when the ignition switch is in the first position. Tape rewind means are activated when the ignition switch is moved to the second position. Thus, a suitable message, such as a reminder to fasten the seat belts, bring your briefcase, lock the house, and so forth, can be prerecorded on the tape. After the engine has started, the key will revert to the first position in which the taped message will be activated to provide the recorded reminder. Once the taped message has been played, the switch can be moved voluntarily to the second position, in which the automobile engine will still be running, to deactivate the message and rewind the tape. The tape player is removable from the tape drive so that the message can be changed at will to suit the driver's needs.

Thus, the driver has voluntary control over the content of the messages provided by the message device, and a reminder to fasten the seat belts can be provided without requiring mandatory fastening of the seat belts.

DRAWING

These and other aspects of the invention will be more fully understood by referring to the following detailed description and the accompanying DRAWING which shows a schematic circuit diagram illustrating the automobile ignition switch controlled message device according to this invention.

DESCRIPTION

Referring to the drawing, a message actuating system 10 for automobiles includes an automobile ignition lock 12 mounted on an instrument panel or dashboard (not shown) of an automobile (not shown). The ignition lock is adapted to open and close an ignition switch 14 in response to the rotation of an ignition key (not shown) which fits into a key slot in a key barrel 16 of the ignition lock. The key barrel 16 rotates between "lock", "off", "on (2)", "on (1)" and "start" positions.

The ignition switch 14 controls the supply of the electrical energy from a conventional automobile storage battery 18 to the automobile ignition system 20. Thus, when the ignition switch 14 is turned to the start position, the automobile starter motor 22 cranks the automobile in the well-known manner.

After the automobile engine has started, the ignition switch 14 automatically reverts to the on (1) position where an appropriate message is provided to the driver from the message actuating system of this invention. This message is automatically provided when the ignition system is operative and the automobile engine is running. The ignition switch 14 also can be manually turned by the automobile driver to the on (2) position in which the automobile engine will continue to run, but which will deactivate the message device. An interlock (not shown) is provided in the ignition system to keep the ignition system operating continuously while the ignition switch is turned from the on (1) to the on (2) position.

Operation of the message actuating system will be understood best by referring to the schematic circuit diagram of the drawing which represents only schematically a relay controlled electrical system for controlling operation of the message device, it being recognized that other electrical systems, such as a transistor controlled electrical system, or other more complex electrical control systems, and can be used without departing from the scope of the invention.

In the electrically controlled message actuating system shown in the drawing, the ignition switch being in the on (1) position activates a seat belt flashprint warning device 23 preferably located on the dashboard of the automobile so it can be seen by the driver. Such a device includes a flashing lamp which illuminates an appropriate printed message on the dashboard, such as "fasten seat belts", or the like. Alternatively, the seat belt flashprint 23 can be replaced by or combined with a buzzer (not shown), or other audible warning device, to remind the driver to fasten the seat belts.

When the ignition switch is in the on (1) position, it also activates a taped message on a prerecorded tape 24 dispsed in a tape player 26 preferably located in the interior of the automobile. The tape player 26 includes a tape drive spindle 28 driven in forward and reverse directions by a tape drive motor 30, a capstan 32, and a take-up spindle 34. Preferably, the tape drive unit receives a tape cassette (not shown) in which the tape is prerecorded with an appropriate message, such as a reminder to fasten the seat belts, bring your briefcase, check the gas or oil, lock the house, stop at the market, or whatever other prerecorded message or reminder is desired by the driver. The tape can be removed from the tape player and a new message or reminder recorded on it whenever desired.

The tape player 26 is controlled by a tape forward drive relay 36 which includes a normally open contact 38 which moves from its open position to a closed position to run the tape drive motor 30 in the tape forward position when the relay 36 is energized by the driver's turning the ignition switch to the on (1) position.

When the driver wishes to stop the tape message, or to turn off the seat belt flashprint message, the ignition switch is turned manually from the on (1) position to the on (2) position.

In the on (2) position, a tape rewind relay 40 is energized, which closes a normally open contact 42 to run the tape drive motor 30 in the reverse direction to rewind the tape 24 to the beginning of the message. While the automobile is being operated, the ignition switch can stay in the on (2) position to thereafter run the car without the taped message or seat belt warning device being activated.

The electrical system shown in the drawing is only in schematic form, and other control elements can be added without departing from the scope of the invention. For example, the electrical control system can include certain interlock devices known to those skilled in the art for the purpose of completely rewinding the tape and then cutting off electricity to the tape drive motor even after the ignition switch has been turned to its off position. Moreover, the system can include means for cutting off electricity to the tape drive motor once the tape message has been completed and the driver leaves the ignition switch in the on (1) position.

As a further alternative, the ignition switch can be combined with a ball override device similar to that disclosed in my U.S. Pat. No. 3,755,777. The ball override device can be arranged to operate the reminders, such as tape message, flashprint message, or buzzer, as long as the key is in the key barrel. When the key is removed from the key barrel, even though the key barrel is in the on position, the reminders can be deactivated, and the tape rewound. This can be accomplished by means for activating the reminders when the key is in contact with a conductive ball, or the like, which is part of the current for operating the reminders. Once the key is removed, the ball drops out of contact with the circit, opening the circuit to cut off the reminders. This can also activate a circuit for rewinding the tape.

Thus, the present invention provides the driver of an automobile with a reminder to fasten his seat belts, but the reminder can be voluntarily turned to the off position once the reminder has been given. Moreover, the system includes means for providing preselected audible reminders which can be recorded by the driver and which are automatically played when the automobile is started.

We claim:

1. A system for providing a message to the operator of an automobile, the system comprising a keyoperated ignition switch connected to the automobile ignition system, the ignition switch including a key barrel movable between a first position and a second position, means for activating the automobile ignition system when the key barrel is in either the first or second position, so the automobile engine will be operative in either the first or second position of the key barrel, a message device in the interior of the automobile, the message device comprising a tape player including forward tape drive means and tape rewind means, and further including means for activating the forward tape drive means when the key barrel is in the first position, and means for activating the tape rewind means when the key barrel is in the second position.

2. A system according to claim 1 in which the tape player includes means for receiving a removable tape cartridge having an appropriate message recorded on it.

3. A system according to claim 1 in which the tape rewind means completely rewinds the taped message after the key barrel has moved from the first position.

4. A system according to claim 1 in which the key barrell is movable automatically from a start position, which actuates the automobile starter motor, to the first position, and is movable manually from the first position to the second position, so the message device is automatically activated after the automobile is started.

5. A system according to claim 1 which further includes an audible warning device, means for activating the audible warning device when the key barrel is in the first position, and means for deactivating the audible warning device when the key barrel is in the second position.

6. A system according to claim 1 which further includes a visible warning device, means for activating the visible warning device when the key barrel is in the first position, and means for deactivating the visible warning device when the key barrel is in the second position.

7. A system for providing a taped message in an automobile having electrical circuit means for conducting electric current for starting or running the automobile engine, the system comprising a key-operated ignition switch electrically connected to said electrical circuit means and having a key barrel which is movable between a first position and a second position, the ignition switch conducting electrical current for starting or running the engine when the key barrel is in either the first or second position, tape player means in the interior of the automobile including forward tape drive means and tape rewind means each electrically connected to the electrical circuit means, means for conducting electric current to the forward tape drive means when the key barrel is in the first position, and means for conducting electric current to the tape rewind means when the key barrel is in the second position.

8. A system according to claim 7 in which the tape rewind means completely rewinds the taped message after the key barrel is moved to the second position.

9. A system according to claim 7 in which the electrical circuit means includes an automobile engine starter motor, and in which the key barrel is movable automatically from the first position, which activates the automobile starter motor, to the second position, in which the automobile engine is running, the electrical current being conducted to the tape player when the key barrel is in the start position.

10. A system according to claim 7 which further includes an audible warning device, means for activating the audible warning device when the key barrel is in the first position, and means for deactivating the audible warning device when the key barrel is in the second position.

11. A system according to claim 7 which further includes a visible warning device, means for activating the visible warning device when the key barrel is in the first position, and means for deactivating the visible warning device when the key barrel is in the second position.

12. A system according to claim 7 in which the tape player includes means for receiving a removable tape cartridge having a selected message recorded on it.

* * * * *